(12) United States Patent
FitzGerald et al.

(10) Patent No.: US 7,778,169 B2
(45) Date of Patent: Aug. 17, 2010

(54) PACKETIZING MEDIA FOR A TIME SLOTTED COMMUNICATION SYSTEM

(75) Inventors: Cary W. FitzGerald, Palo Alto, CA (US); Helen Marguerite Robison, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 987 days.

(21) Appl. No.: 11/218,978

(22) Filed: Sep. 2, 2005

(65) Prior Publication Data

US 2007/0053373 A1 Mar. 8, 2007

(51) Int. Cl.
H04L 12/26 (2006.01)
H04L 12/56 (2006.01)

(52) U.S. Cl. .................. 370/230; 370/250; 370/252; 370/412; 370/458; 370/474

(58) Field of Classification Search .................. 370/230, 370/250, 252, 412, 458, 474
See application file for complete search history.

(56) References Cited

U.S. PATENT DOCUMENTS

| | | | | |
|---|---|---|---|---|
| 5,204,855 | A * | 4/1993 | Bebee et al. ................. | 370/436 |
| 5,226,041 | A * | 7/1993 | Waclawsky et al. ......... | 370/236 |
| 5,420,866 | A * | 5/1995 | Wasilewski .................. | 370/426 |
| 5,748,631 | A * | 5/1998 | Bergantino et al. .......... | 370/398 |
| 5,765,032 | A * | 6/1998 | Valizadeh ..................... | 709/235 |
| 5,812,528 | A * | 9/1998 | VanDervort .................. | 370/235 |
| 5,812,545 | A * | 9/1998 | Liebowitz et al. ........... | 370/337 |
| 5,926,458 | A * | 7/1999 | Yin ............................ | 370/230 |
| 6,389,474 | B1 * | 5/2002 | Chien et al. .................. | 709/232 |
| 6,404,753 | B1 * | 6/2002 | Chien et al. .................. | 370/337 |
| 6,430,160 | B1 * | 8/2002 | Smith et al. .................. | 370/252 |
| 6,711,137 | B1 * | 3/2004 | Klassen et al. .............. | 370/252 |
| 6,763,025 | B2 * | 7/2004 | Leatherbury et al. ... | 370/395.64 |
| 6,831,892 | B2 * | 12/2004 | Robinett et al. ............. | 370/232 |
| 6,885,641 | B1 * | 4/2005 | Chan et al. ................... | 370/252 |
| 6,891,841 | B2 * | 5/2005 | Leatherbury et al. ........ | 370/401 |
| 6,925,070 | B2 * | 8/2005 | Proctor, Jr. .................. | 370/335 |
| 6,963,580 | B2 * | 11/2005 | Chien et al. .................. | 370/445 |
| 7,027,414 | B2 * | 4/2006 | Walsh et al. ................. | 370/316 |

(Continued)

OTHER PUBLICATIONS

Schulzrinne, H., et al., "RTP: A Transport Protocol for Real-Time Applications", RFC 3550 (Obsolete 1889), 98 pages, Jul. 2003.

(Continued)

*Primary Examiner*—Alpus H Hsu
(74) *Attorney, Agent, or Firm*—Stolowitz Ford Cowger LLP

(57) ABSTRACT

Media that is normally packetized into many separate individual packets and then queued for individual transmission during a transmit window is combined together into one, or a few, packets. The larger packets more efficiently carry media over a time slotted communication media since only one, or a few, packet headers are used for carrying a larger amount of media. Since packets cannot be transmitted until the start of a new transmit window, the larger packets do not substantially add to the overall packet delay that normally occurs when larger packets are formatted and transmitted in non-time slotted networks.

In another aspect of the system, probe packets are used to identify the start of the transmit window. The transmit window start time is inferred from the round trip times for the probe packets and media packetization is then synchronized with the identified transmit windows.

24 Claims, 7 Drawing Sheets

U.S. PATENT DOCUMENTS

| | | | |
|---|---|---|---|
| 7,245,584 B2 * | 7/2007 | Goringe et al. | 370/232 |
| 7,486,617 B2 * | 2/2009 | Kokko | 370/229 |
| 7,499,402 B2 * | 3/2009 | Keating et al. | 370/235 |
| 7,529,247 B2 * | 5/2009 | Rogers | 370/395.2 |
| 2001/0024446 A1 * | 9/2001 | Craig et al. | 370/412 |
| 2002/0025141 A1 * | 2/2002 | Matsumoto et al. | 386/96 |
| 2005/0053053 A1 * | 3/2005 | Smith et al. | 370/352 |

OTHER PUBLICATIONS

FitzGerald, C., et al., "Improved Delivery of Packet Voice over Satellite", EDCS 439278, revised May 10, 2005, 6 pages.

* cited by examiner (BACKGROUND)

FIG. 2 (BACKGROUND)

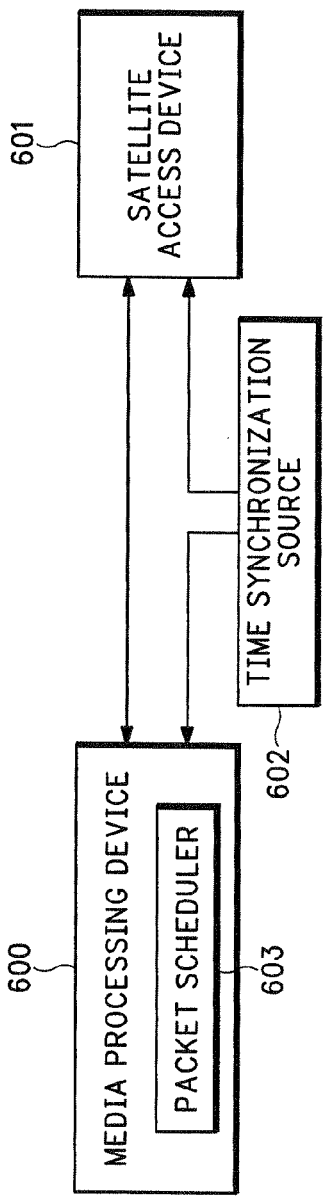
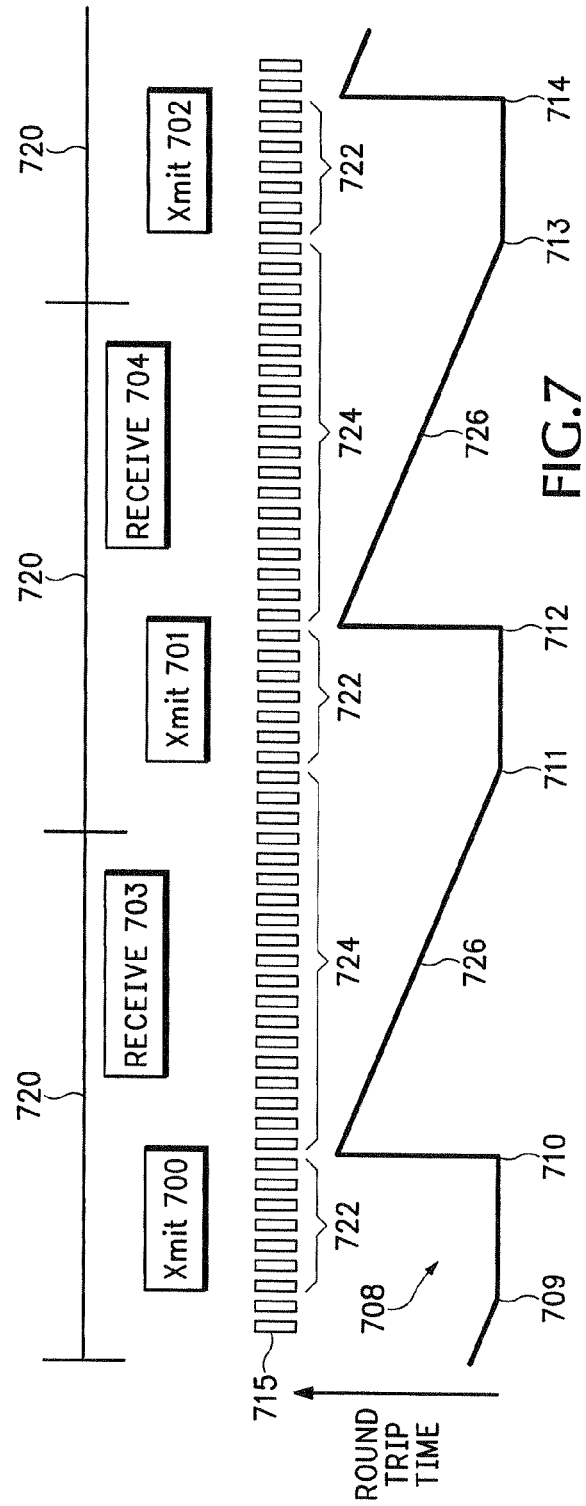

PACKETIZING MEDIA FOR A TIME SLOTTED COMMUNICATION SYSTEM

BACKGROUND OF THE INVENTION

1. Field of the Invention

The present invention relates to packet based communications and more specifically to devices, software, and methods for more efficiently packetizing data for transmission over a time slotted communication system.

2. Description of the Related Art

Many parts of the world do not have wide deployment of hard-wired Public Switched Telephone Networks ("PSTN") or packet switched Internet networks. A wide variety of alternative access media, such as satellite communications, are often used in this areas.

FIG. 1 shows a conventional Voice Over Internet Protocol (VoIP) over satellite communication system 50. A voice endpoint 100 communicates with another voice endpoint 104 via a communication satellite 108. In this example, endpoints 100 and 104 generate packets 101 that are sent and received via satellite 108 through satellite access devices 102 and 106, respectively.

Access via satellite links is distinguished by several characteristics. One characteristic is an intrinsically large delay typically around 200-500 milliseconds due to the propagation delay required to reach satellite 108 in geosynchronous orbit. Another characteristic of the satellite data channel are predetermined transmit and receive windows 200 and 203, respectively, for receiving and transmitting packets 101. The transmit windows 200 and the receive windows 203 have a fixed time period 110 that is known by both the satellite access devices 102 and 106 and satellite 108.

The satellite access device 102 queues packets 101 for transmission while transmit window 200 is closed. Once the transmit window 200 opens, the satellite access device 102 transmits the previously queued packets 101 (typically 12 or 13 packets) and also transmits any other packets 101 that are received from the voice endpoint 100 before the close of the transmit window 200 (typically 2 or 3 packets). The communication satellite 108 works similarly, receiving and queuing packets 101 during the transmit windows 200 and relaying the queued packets 101 back to a destination satellite access device 106 during receive windows 203.

FIG. 2 shows in more detail how packets are transmitted in the VoIP over satellite system 50 shown in FIG. 1. A communication cycle Cx 224 includes continuously repeating fixed length transmit and receive time intervals. A transmit time interval Tx 223 represents the fixed time period for transmit windows 200, 201, and 202 in each communication cycle 224A-224C. A receive time interval Rx 225 represents the fixed time period for receive windows 203, and 204 in each communication cycle 224.

Packets 205-221 represent a packetized voice stream 230 generated by the voice endpoint 100 in FIG. 1 that is then transmitted by the satellite access device 102 to the other voice endpoint 104 via the satellite 108. In a first communication cycle 224A, packet 205, and any previously queued packets, are separately and individually transmitted via the satellite access device 102 at the opening of transmit window 200. Packets 206 and 207 are received from voice endpoint 100 after the opening of the transmit window 200 and are also transmitted before the close of transmit window 200.

Any packets received after the close of transmit window 200 are queued for separate transmissions during a next transmit window 201 in a next communication cycle 224B. For example, packets 208-212 are each packetized by the voice endpoint 100 and each separately transmitted by the satellite access device 102 at the start of the next transmit window 201. Subsequently received packets 213 and 214 that arrive before the close of the transmit window 201 are also transmitted during transmit window 201.

Packets 215-218 are received after the end of transmit window 201 and are therefore queued for transmission at the opening of a next transmit window 202 during communication cycle 224C. Packets 219 and 220 are received before the end of transmit window 202 and are therefore also transmitted during transmit window 202. Packet 221 is queued for transmission during a next transmit window not shown in FIG. 2.

Receive windows 203 and 204 work similarly. The communication satellite 108 in FIG. 1 is configured to transmit the individual packets previously received during transmit windows 200, 201 and 202 back to the satellite access devices 106 during receive windows 203 or 204.

Typically each packet 205-221 is formatted by the voice endpoint 100 with 40 bytes of overhead header data that includes 20 bytes for the IP header, 8 bytes for the User Datagram Protocol (UDP) header, and 12 bytes for the Real-time Transport Protocol (RTP) header. The packets 205-221 also each include a payload which can be as small as 20 bytes in the case of an 8 kilo-bits per second (kbps) Coder-Decoder (CODEC) such as specified in International Telecommunications union (ITU)-T G.729. Such high data overhead and small payload results in a poor utilization of satellite bandwidth.

The present invention address this and other problems associated with the prior art.

BRIEF SUMMARY OF THE INVENTION

Media that is normally packetized into many separate individual packets and then queued for individual transmission during a transmit window is combined together into one, or a few, packets. The larger packets more efficiently carry media over a time slotted communication media since only one, or a few, packet headers are used for carrying a larger amount of media. Since packets cannot be transmitted until the start of a new transmit window, the larger packets do not add to the overall packet delay that normally occurs when larger packets are formatted and transmitted in non-time slotted networks.

In another aspect of the system, probe packets are used to identify the start of the transmit window. The transmit window start time is inferred from the round trip times for the probe packets and media packetization is then synchronized with the identified transmit windows.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 6 shows a time synchronization source used for synchronizing packet transmissions with communication system timing.

FIG. 7 shows how the transmit window can be detected using probe packets.

DETAILED DESCRIPTION OF THE INVENTION

Figure 1:
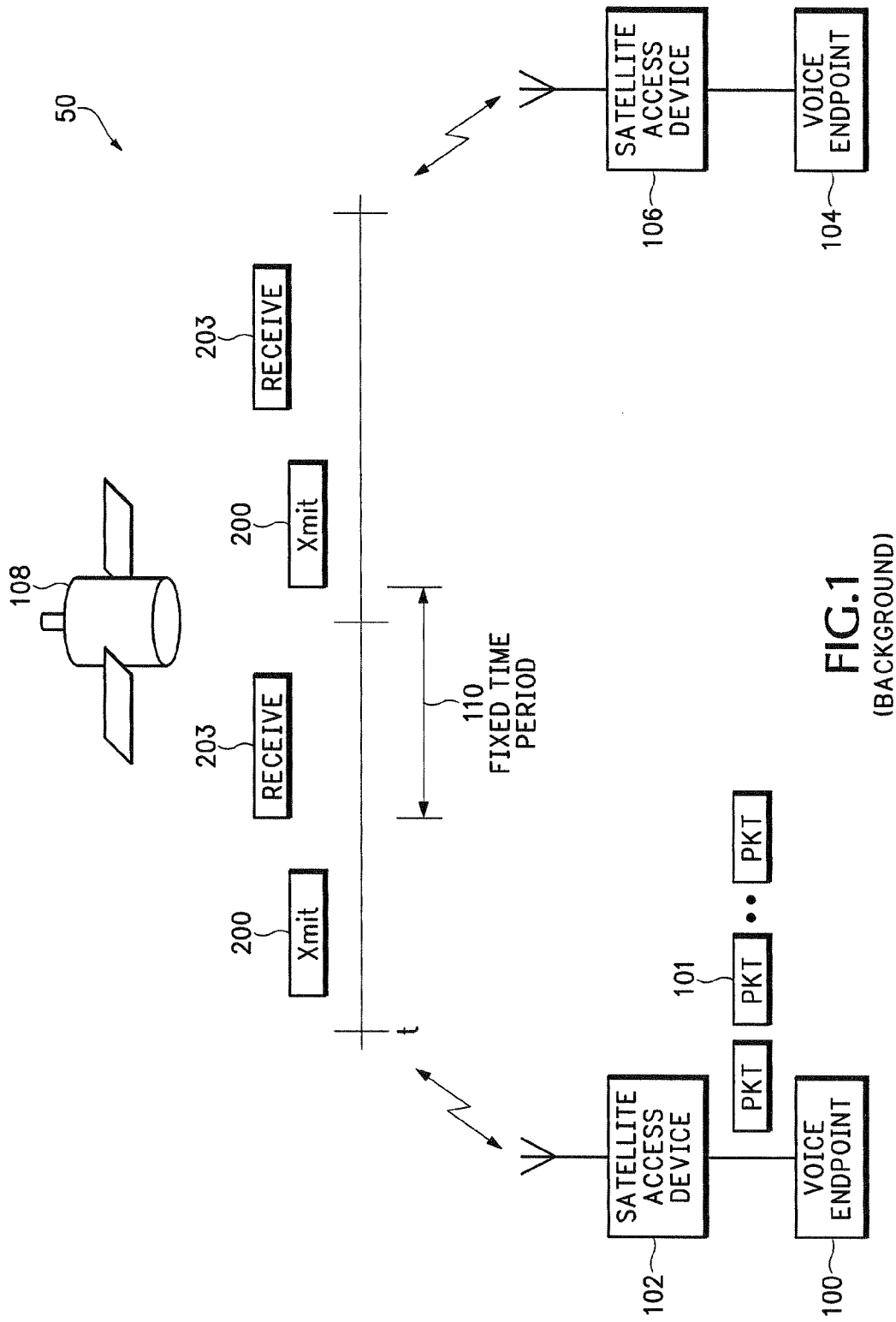
FIG. 1 shows a time slotted communication system.
Figure 2:
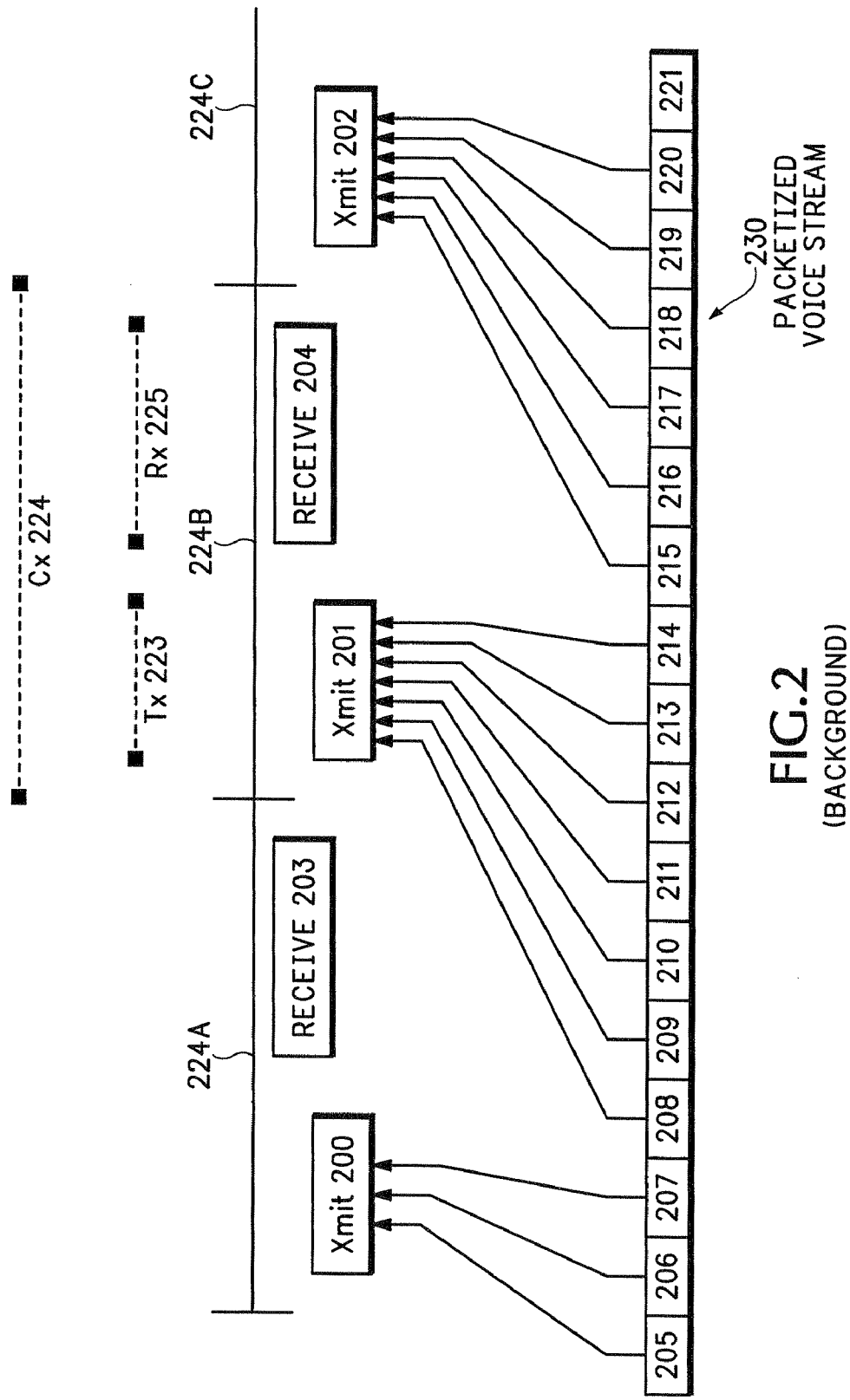
FIG. 2 shows how packets are formatted and queued in the time slotted communication system shown in FIG. 1.
Figure 3:
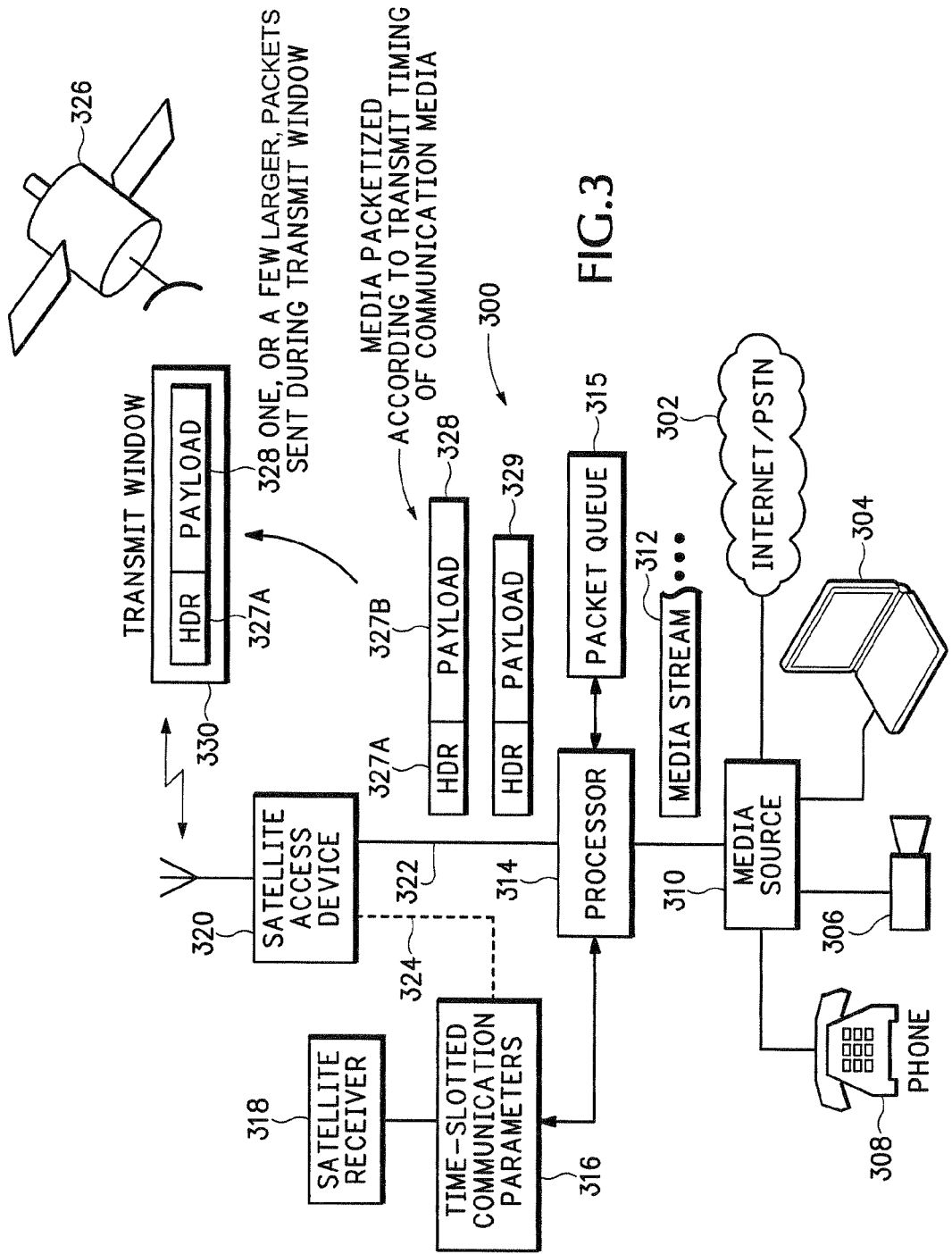
FIG. 3 shows one embodiment of a system that more efficiently transmits packet data over a time slotted communication system.

FIG. 3 shows a device or system 300 that more efficiently uses bandwidth in a time-slotted communication system. A processor 314 receives media 312 from a media source 310. The media 312 can be any type of data that needs to be packetized. For example, the media 310 can be audio data received from a phone 308, video and audio data received from a video camera 306, or any other type of media received from a computer 304 or received over a packet switched (Internet) or circuit switched network 302.

The processor 314 buffers the media 312 in a packet queue 315 and then packetizes the media 312 according to communication system parameters 316 used in the time slotted satellite communication system for communicating with satellite 326. At least some of the communication parameters 316 include the timing for transmit windows. For example, the processor 314 may combine all of the media queued in packet queue 315 into a single packet 328 while waiting for a next transmit window 330 A satellite access device 320 may include wireless transceiver circuitry that transmits the packet 328 to the satellite 326 during the next transmit window 330. The processor 314 may also format one, or a few, other packets 329 for media 312 that is received from the media source 310 during the transmit window 330.

As shown in FIG. 3, the larger packet 328 only requires a single packet header 327A to carry a larger amount of media payload 327B. Thus, more media 312 can be transmitted using a smaller amount of satellite communication bandwidth. Because packets cannot be transmitted until the start of a next transmit window 330, the larger packet 328 does not substantially add to the packet delay that might normally occur in non-time slotted networks.

The different logical blocks in FIG. 3 may be arranged differently according to the particular implementation of the media endpoint operating system 300. For example, the processor 314 that packetizes the media 312 may be located in the phone 308, camera 306, or computer 304. Alternatively, the processor 314 may be located in a gateway, router, switch, access point, or any other network processing device that needs to packetize media for transport over a time slotted communication system. In yet another embodiment, the operating system 300 or processor 314 that packetizes the media 312 may be located in the satellite access device 320. The phone 308 can be any type of Voice Over Internet Protocol (VoIP) phone that could then include the processor 314. Alternatively, a conventional analog phone can generate analog audio data 312 that is then converted into audio packets by processor 314.

Similarly, the satellite access device 320 may be a separate device that communicates with processor 314 over connection 322 or may be integrated into the same chassis and/or circuitry as processor 314. The processor 314 may receive the time slotted communication parameters 316 that identify the timing for transmit and receive windows directly from the satellite access device 320 over a connection 324 or may receive the timing parameters via a separate satellite receiver 318 that may include a reference clock or timestamp used by processor 314 to synchronize the packetization of media 312 with the transmit windows 330. For example, the satellite receiver 318 may receive a time synchronization source, such as a Global Positioning System (GPS) or Stratum 2 clock, that is used as a time reference for synchronizing to transmit window 330.

The example described in FIG. 3 relates to satellite communications. However, it should be understood that the packetization system described here can be used for any wireless or wired communication media that transports media over timeslots.

Packetization Schemes

Figure 4:
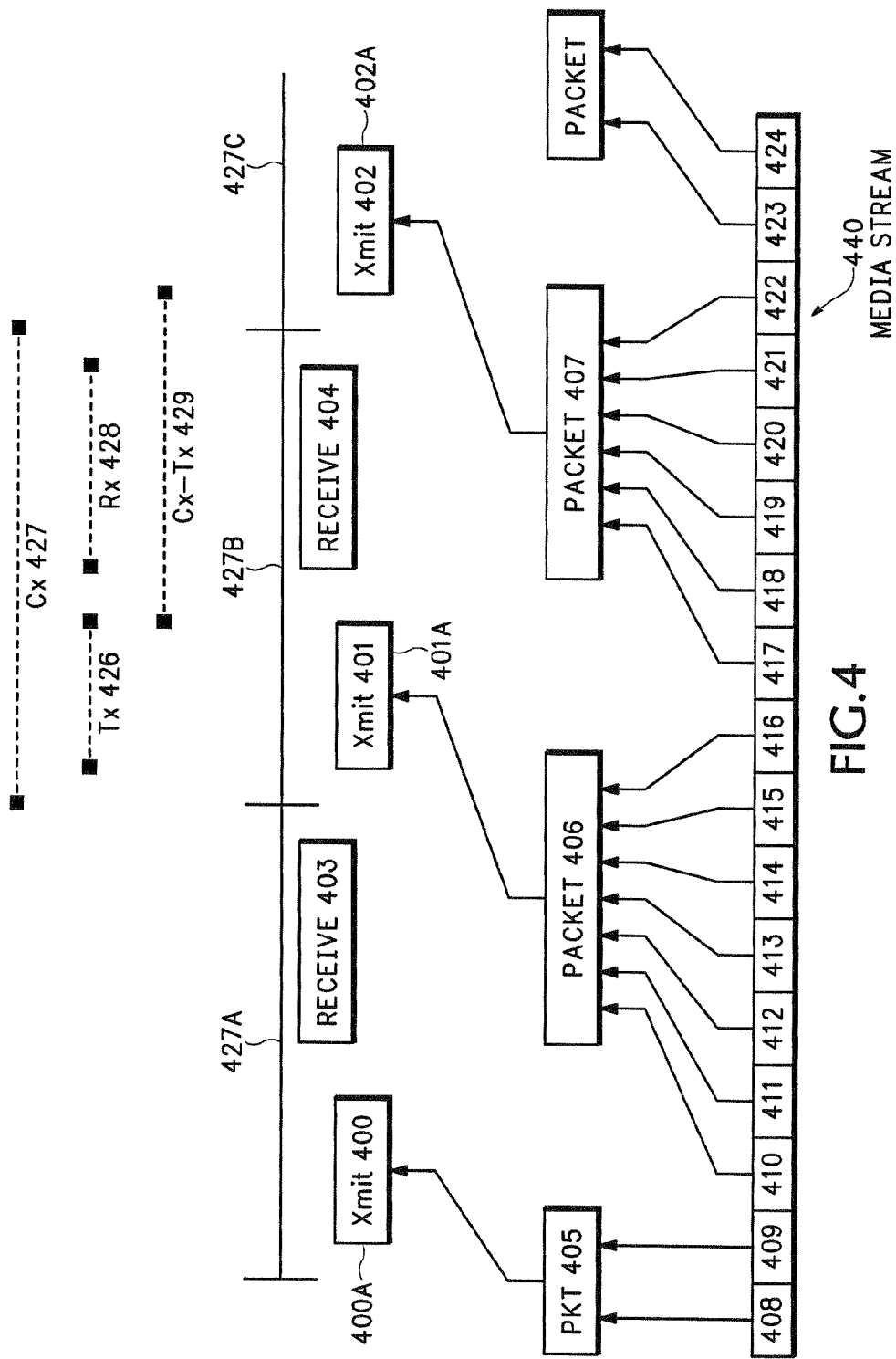
FIG. 4 shows one technique for more efficiently packetizing media for time slotted communication systems.

FIG. 4 shows one packetization scheme in more detail. A complete transmit and receive cycle is represented by Cx 427. The interval of a transmit window is represented as Tx 426 and the interval of a receive window is represented as Rx 428. For explanation purposes, media stream 440 is shown in different portions 408-424. In this example, each portion of media 408-424 may correspond with an amount of media conventionally formatted into a separate packet. However, in actual application, the media stream 440 may be received by the processor 314 in FIG. 3 as a continuous or semi-continuous non-packetized stream of data. Alternatively, the media stream 440 may be received in packets that are then reformatted by processor 314 into larger packets 405-407.

In this example, media portions 408 and 409, and possibly other media, is received after a midpoint of a previous transmit window (not shown) and before a midpoint 400A of a next transmit window 400. The media 408 and 409 is combined into one packet 405 and transmitted during transmit window 400 in communication cycle 427A. Media portions 410-416 are received after the midpoint 400A of transmit window 400 and before a midpoint 401A of transmit window 401. Media 410-416 is combined into one packet 406 and transmitted at some time around the midpoint of transmit window 401 in communication cycle 427B. Similarly, media 417-422 is received after the midpoint 401A of transmit window 401 and before the midpoint 402A of transmit window 402. Media 417-422 is combined into one packet 407 and transmitted around the midpoint 402B of transmit window 402 in communication cycle 427C.

In this example, the larger packets 405, 406, and 407 contain all queued media for a non-transmit time interval Cx-Tx 429, plus any media received during a last half of a previous transmit interval Tx/2 and any media received during a first half of a next transmit window. This reduces packet header overhead cost while adding only minor delay while the larger media packets are being queued. Since much of the queued media cannot be transmitted until the start of a next transmit window, combining this already delayed media together into a same packet does not significantly add additional packet delay. For example, media 411-415 can not be transmitted until the start of transmit window 401, regardless of the packet size used for carrying the media.

In addition to better utilization of satellite bandwidth, media can be sorted before being combined into one packet. This may reduce the perceived jitter at the destination endpoint and may prevent the receiving endpoint from having to use a jitter buffer to sort late or lost packets.

Figure 5A:
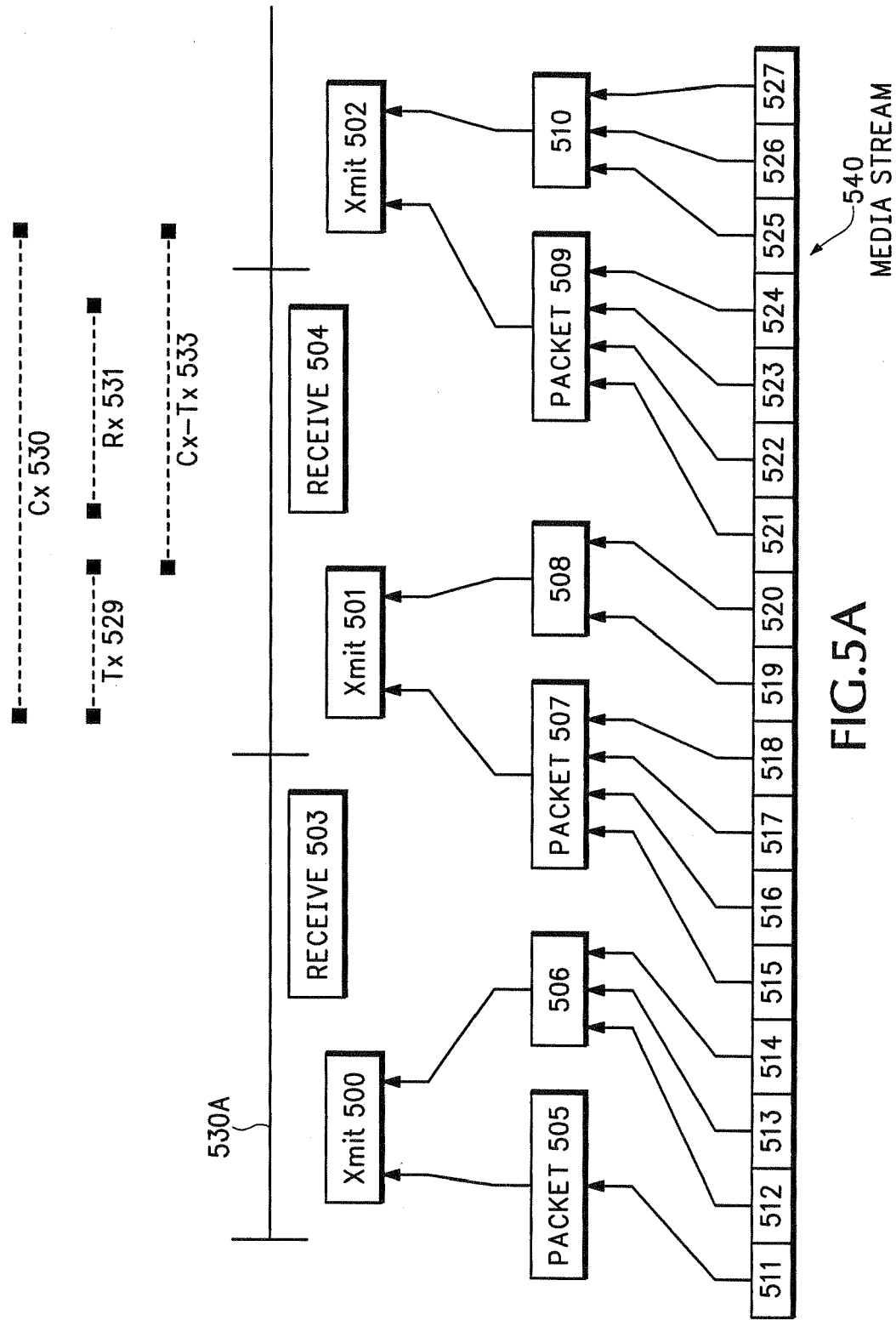
FIG. 5A shows another technique for packetizing media for time slotted communication systems.

The selection of the transmit window midpoints is merely one of many different possible embodiments. For example, FIG. 5A shows an alternative embodiment where media 540 is combined into two packets for each communication cycle 530. In this embodiment, one packet is transmitted at the beginning of a transmit window and another packet transmitted before the close of the transmit window. Use of this method achieves good utilization of satellite bandwidth, but with less delay for some of the media received during a transmit window.

As before, the time slotted media has a repeating transmit and receive cycle Cx 530 that includes a transmit interval Tx 529 and a receive interval Rx 531. Referring first to communication cycle 530A, media 511 is received after the end of a previous transmit window (not shown) and prior to the beginning of a next transmit window 500 and is accordingly combined into one packet 505.

Any other media 512-514 received during the transmit window 500 is combined into one or more additional packets 506 and transmitted before the end of the transmit window 500. The packets formatted for the media received during the transmit window 500 may be of a conventional packet size. This minimizes packet delay where possible but uses additional bandwidth.

Similarly, any media 515-518 received after the end of the transmit window 500 and before the start of a next transmit window 501 is combined into packet 507 and transmitted at the beginning of transmit window 501. Any other media 519 and 520 received during transmit window 501 is combined in another packet 508 and transmitted before the end of transmit window 501. Likewise, media 521-524 is combined and transmitted in packet 509 at the start of transmit window 502 and media 525-527 received during transmit window 502 is combined and transmitted in packet 510 before the end of transmit window 502.

Figure 5B:
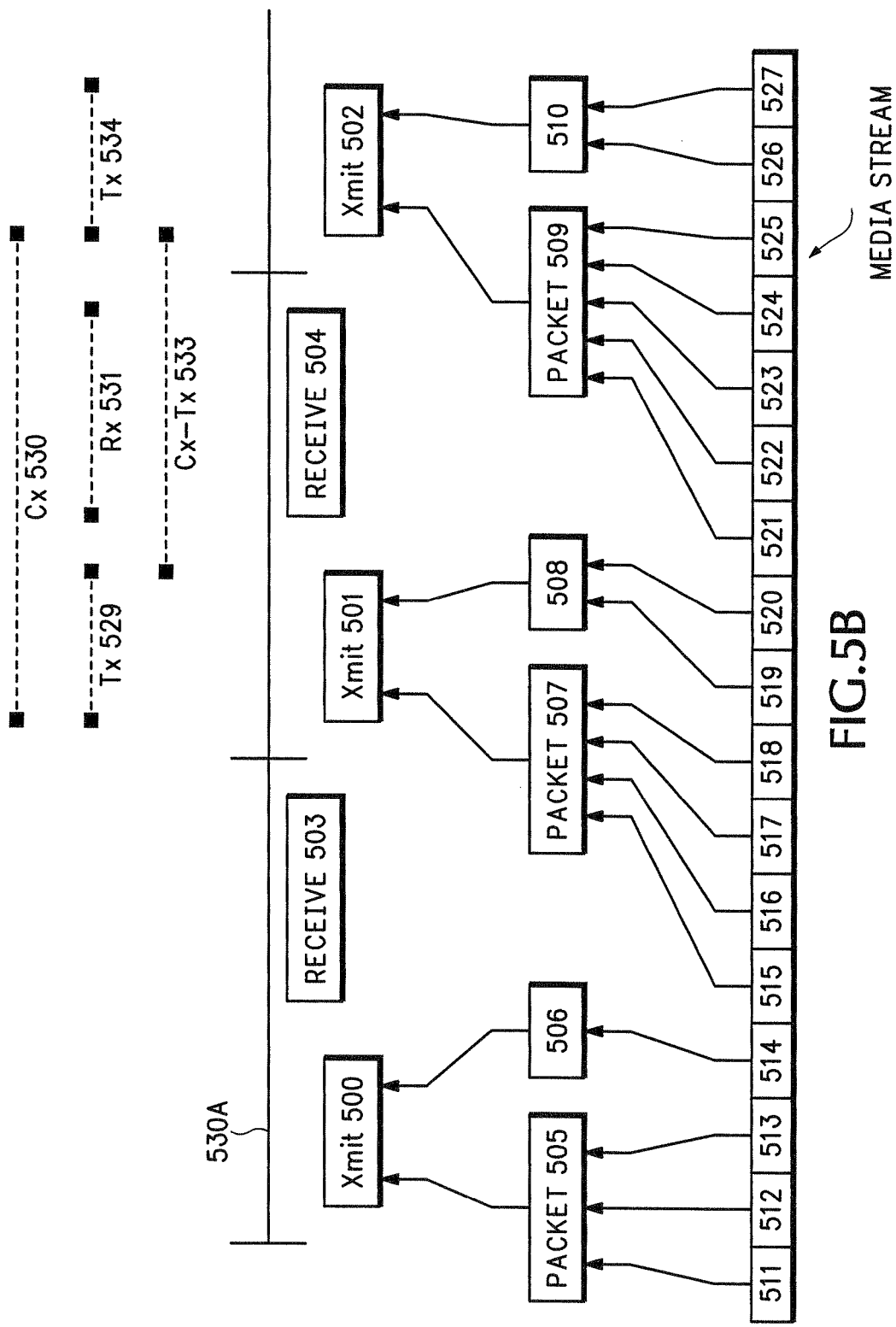
FIG. 5B shows yet another technique for packetizing media for time slotted communication systems.

The packetization shown in FIG. 5A utilizes more satellite bandwidth than the scheme shown in FIG. 4 but reduces some packet delay. Other embodiments may combine the media is still other ways to further tradeoff bandwidth and packet delay. For example, FIG. 5B shows yet another embodiment where media is combined from the end of a previous transmit window to the middle of a next transmit window. Then one or more packets are transmitted for any media that is received during a second half of the next transmit window.

Packets scheduled at the end of a transmit window may need to be guaranteed access to the satellite media channel before the transmit window closes. The satellite access device 320 (FIG. 3) can reserve bandwidth (and time) for the packets sent near the close of the transmit windows. Alternatively, the satellite access device 320 can implement a priority scheme that schedules transmission of packets before the close of the transmit window to account for a Maximum Transmission Unit (MTU) sized packet that might be just starting transmission as the voice equipment starts to schedule the media packets.

Time sensitive packets, such as voice packets, may be scheduled out on the time slotted network as quickly as possible. A priority scheme that favors voice packets over other kinds of traffic can ensure that the voice packets are transmitted first. The system 300 in FIG. 3 can determine the number of voice streams operating simultaneously and may schedule the packets transmitted at the start of the transmit window such that the voice packets arrive in a consistent order and in a staggered manner. The interval between voice streams can be scheduled to be approximately equal to the transmission time of the preceding voice streams to minimize interference between the streams.

Identifying Transmit and Receive Windows

FIG. 6 shows a media processing device 600 similar to that shown in FIG. 3 that operates a packet scheduler 603 and further shows a satellite access device 601 used for transmitting the packets formatted by media processing device 600. A time synchronization source 602 is used by the media processing device 600 to determine how much media to packetize for a next transmit window and is used by the satellite access device 601 to then transmit queued packets during a next transmit window and receive packets during a next receive window.

When the media processing device 600 and the satellite access device 601 share the time synchronization source 602, the timing for the opening of the transmit and receive windows relative to some reference time can be configured directly into the packet scheduler 603. This may be convenient if the media processing device 600 and the satellite access device 601 are packaged in the same physical chassis. In this embodiment, the media processing device 600 and satellite access device 601 may share or individually operate time synchronization sources that are used for synchronizing with the receive window.

If the timing relationship between the transmit window and the receive window is well known, the media processing device 600 can infer the opening of the transmit window when any packet is first received from the satellite access device 601. Assuming that there are packets to receive at the opening of the receive window, the leading edge of the receive window can be reliably determined. This will be the receive time of the packet, minus the serialization time the packet had on the satellite media, minus the propagation time required for the packet to transmit from the satellite access device to the voice equipment.

FIG. 7 shows yet another embodiment where probe packets are used to infer the opening of the transmit window. The media processing device 600 in FIG. 6 generates probe packets 715 that are then sent to the satellite access device 601. The satellite access device 601 queues the probe packets 715 in the same manner described above in FIGS. 3-5. However, in this case, the probe packets 715 are not combined together into one or a few media packets by the processor 314. Once the transmit windows 700, 701, and 702 open, the satellite access device 320 transmits the queued probe packets 715 as well as other probe packets generated by the media processing device 600 during the transmit windows.

The satellite 326 (FIG. 3) queues the received probe packets 715 and then returns them back to the same satellite access device 601 during the receive windows 703 and 704. After receiving the probe packets from the satellite 326, the satellite access device 601 transfers the returned probe packets 715 to the media processing device 600. The media processing device 600 determines the round trip delay for each probe packet 715 by comparing the time that each probe packet was initially queued to the satellite access device 601 with the time the same probe packet was received back from the satellite access device 601.

Round trip times for the probe packets 715 sent and received back by the media processing device 600 for transmit and receive cycles 720 are represented by graph 708. The media processing device 600 infers the timing of the transmit windows 700, 701 and 702 from probe packet round trip times illustrated in graph 708. The minimum round trip times for the probe packets 705 in graph 708 correspond with the transmit windows 700, 701 and 702.

For example, probe packets 722 are sent by the media processing device 600 when the transmit windows 700, 701 and 702 are open and are therefore immediately transmitted, or transmitted with little delay, by the satellite access device 601. Time 709, 711, and 713 in graph 708 indicate the beginning of the transmit windows 700, 701, and 703, respectively, where the probe packets are received back with minimum round-trip delays.

Packets 724 are output by the media processing device 600 just after the end of the transmit windows 700, 701, and 702. Accordingly, packets 724 will initially have the largest round trip delay and then have progressively smaller round trip delays until the beginning of a next transmit window. This is illustrated in graph 708 at times 710, 712, and 714 where the round trip delay spikes from a minimum to a maximum value and then progressively moves during times 726 to a minimum round trip delay at times 709, 711, and 713.

The media processing device 600 accordingly infers the beginning and end times for the transmit windows 700-702 and the receive windows 703 and 704 from derived times 709-714. For example, when there is a fixed time period for the transmit window, the media processing device 600 simply needs to subtract this fixed time period from identified times 710, 712, and/or 714 to determine the start of any transmit window. Similarly, when a fixed time period exists between the start of the transmit window and the start of the receive window, the media equipment, can simply add that fixed time to time 710, 712, and/or 714 to determine the start and finish time for the receive windows 703 and 704. Of course these derived times may be slightly adjusted to account for propagation delays.

One implementation may choose to periodically schedule probe packets just before the anticipated open and close of some predetermined number of transmit windows 700-702 and then resynchronize an internal packetization clock with the transmit window time inferred from the calculated probe packet round trip times.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method of transmitting packet data, comprising:
    receiving a packetized media stream;
    identifying a portion of the packetized media stream that is queued while waiting for a transmit window, wherein the identified portion comprises a first number of packet payloads;
    queuing probe packets during both a transmit cycle and a receive cycle;
    comparing round trip times for the probe packets;
    identifying the transmit window according to the round trip time comparisons;
    utilizing a processor to re-packetize the identified portion of the packetized media stream, wherein said re-packetizing combines media from the first number of packet payloads into a second different number of packet payloads, wherein the second number is less than the first number; and
    sending the re-packetized portion of the media stream during the transmit window.

2. The method according to claim 1, including combining a portion of the packetized media stream that is queued from an end of a previous transmit window up to at least a beginning of a next transmit window into a single packet.

3. The method according to claim 2 including combining at least a portion of the packetized media stream that is received during the previous transmit window into the same packet or combining at least a portion of the packetized media stream that is received during the next transmit window into the same packet.

4. The method according to claim 1, including sending a packet having a payload that contains media received in the stream while waiting for the transmit window and media received in the stream during the transmit window.

5. The method according to claim 1, including identifying when the round trip times for the probe packets spike from a relatively short round trip time to a relatively large round trip time as an end of the transmit window and using the identified end of the transmit window to determine what media to combine into a same packet.

6. The method according to claim 1, including receiving the re-packetized portion of the media stream during a receive window.

7. A media packetizer, comprising:
    a processor configured to combine media into a same packet according to an amount of media received while waiting for a next transmit window;
    wherein the processor queues individual probe packets during an entire transmit and receive cycle for a slotted communication system and then identifies the transmit window by comparing the round trip times for the received probe packets.

8. The media packetizer according to claim 7, wherein the processor identifies an end of the transmit window by detecting a sharp increase in the probe packet round trip times and uses the identified end of the transmit window to infer the start time for the transmit window.

9. A system for transmitting packets over a slotted communication system, comprising:
    means for combining all media queued while waiting for a transmit window into at least one packet;
    means for queuing probe packets during both the transmit window and a receive window;
    means for comparing round trip times for the probe packets;
    means for identifying the transmit window according to the round trip time comparisons; and
    means for sending the at least one packet during the identified transmit window.

10. The system according to claim 9, including means for combining at least all the media queued from an end of a previous transmit window up to at least a beginning of a next transmit window into the at least one packet.

11. The system according to claim 10, including means for combining at least a portion of the media received during the previous transmit window or at least a portion of the media received during the next transmit window into the at least one packet.

12. The system according to claim 9, including means for sending at least one additional packet that contains additional media received during the transmit window.

13. A memory device storing code that, if executed, results in:
- queuing probe packets during both transmit windows and receive windows;
- identifying when the probe packets are queued;
- identifying when the probe packets are received back;
- identifying round trip times from when the probe packets are queued to when the probe packets are received back;
- identifying the transmit or receive windows by comparing the round trip times for the probe packets; and
- transmitting or receiving packet data during the identified window.

14. The memory device of claim 13 wherein the code, if executed, further results in:
- transferring the probe packets to a satellite access device;
- identifying output times when the probe packets are transferred to the satellite access device;
- identifying receive times when the probe packets are received back from the satellite access device;
- determining round trip times for the probe packets according to the identified output times and receive times; and
- inferring when the transmit windows are open according to the determined round trip times.

15. The memory device of claim 14 wherein the code, if executed, further results in:
- inferring when one of the transmit windows ends by identifying when the determined round trip times for the probe packets spike from having a shortest round trip time to a longest round trip time.

16. The memory device of claim 13 wherein the code, if executed, further results in:
- combining media queued for transmission during a next transmit window into a same media packet and sending the media packet during the next transmit window.

17. A memory device containing code that, if executed, results in:
- receiving a packetized media stream;
- queuing probe packets during both a transmit cycle and a receive cycle;
- comparing round trip times for the probe packets;
- identifying a transmit window according to the round trip time comparisons;
- identifying a portion of the packetized media stream that is queued while waiting for the transmit window, wherein the identified portion comprises a first number of packet payloads;
- utilizing a processor to re-packetize the identified portion of the packetized media stream, wherein said re-packetizing combines media from the first number of packet payloads into a second different number of packet payloads, wherein the second different number is less than the first number; and
- sending the re-packetized portion of the media stream during the transmit window.

18. The memory device according to claim 17, wherein the code, if executed, results in combining queued media from at least an end of a last transmit window to at least a beginning of the next transmit window into the same packet.

19. The memory device according to claim 18, wherein the code, if executed, results in combining additional media received during the last transmit window or additional media received during the next transmit window into the same packet.

20. The memory device according to claim 18, wherein the code, if executed, results in combining other media received during the last transmit window or during the next transmit window into another packet.

21. The memory device according to claim 17, wherein the code, if executed, results in sending the packets to a satellite access device during the transmit window.

22. The memory device according to claim 21, wherein the code, if executed, results in synchronizing according to a transmit window time in response to the satellite access device identifying the transmit window time.

23. The memory device according to claim 17, wherein the memory device is located in a media source device, network processing device, or satellite access device.

24. The memory device according to claim 17, wherein the code, if executed, results in causing a satellite receiver to synchronize media packetization according to a satellite-transmitted global time clock.

* * * * *

UNITED STATES PATENT AND TRADEMARK OFFICE
CERTIFICATE OF CORRECTION

PATENT NO.       : 7,778,169 B2                                    Page 1 of 1
APPLICATION NO.  : 11/218978
DATED            : August 17, 2010
INVENTOR(S)      : FitzGerald et al.

It is certified that error appears in the above-identified patent and that said Letters Patent is hereby corrected as shown below:

At column 8, line 10, please replace "claim 2" with --claim 2,--.

Signed and Sealed this
Twenty-sixth Day of July, 2011

David J. Kappos
*Director of the United States Patent and Trademark Office*